United States Patent [19]

Oroza

[11] Patent Number: 4,729,072
[45] Date of Patent: Mar. 1, 1988

[54] FRONT LIGHTING SYSTEM FOR MOTOR VEHICLE

[76] Inventor: Carlos Oroza, 10972 Granby Ct., Reston, Va. 22091

[21] Appl. No.: 5,870

[22] Filed: Jan. 21, 1987

[51] Int. Cl.⁴ .............................................. B60Q 1/04
[52] U.S. Cl. ........................................ 362/80; 362/61; 362/298; 362/302; 362/373
[58] Field of Search .................. 362/61, 80, 297, 298, 362/302, 304, 373

[56] References Cited

U.S. PATENT DOCUMENTS

| | | | |
|---|---|---|---|
| 1,363,583 | 12/1920 | Gallaher | 362/80 |
| 1,419,482 | 6/1922 | Wood | 362/297 |
| 1,513,683 | 10/1924 | Westover | 362/298 X |
| 1,523,841 | 1/1925 | Schoonmaker | 362/298 |
| 1,546,281 | 7/1925 | Brown | 362/297 |
| 1,598,106 | 8/1926 | Schoonmaker | 362/298 X |
| 1,671,671 | 5/1928 | Cordes | 362/61 X |
| 1,698,905 | 1/1929 | Beechlyn | 126/451 X |
| 3,037,139 | 5/1962 | Myers | 362/61 X |
| 3,502,858 | 3/1970 | Håbro et al. | 362/373 |
| 3,588,492 | 6/1971 | Pollock | 362/309 |
| 4,042,818 | 8/1977 | Green | 362/247 |
| 4,208,704 | 6/1980 | Draper | 362/297 |
| 4,219,867 | 8/1980 | Zehender | 362/19 |
| 4,389,698 | 6/1983 | Cibie | 362/632 |
| 4,456,948 | 6/1984 | Brun | 362/268 |
| 4,620,269 | 10/1986 | Oyama | 362/80 |

FOREIGN PATENT DOCUMENTS 1387230 12/1964 France .

Primary Examiner—Samuel Scott
Assistant Examiner—Allen J. Flanigan
Attorney, Agent, or Firm—Dennison, Meserole, Pollack & Scheiner

[57] ABSTRACT

A motor vehicle front lighting system including a pair of parabolic reflectors each including a light source located in the focus of the respected reflector. The reflectors are positioned such that the light rays produced are directed transversely of the front of the motor vehicle. A plurality of mirrors is located in the path of the light rays and generally at an acute angle to the light rays, the mirrors directing the light rays forwardly of the motor vehicle. Selected angular orienting of the mirrors or, alternatively, light directing lens, direct a substantial portion of the light rays downwardly in a non-glare manner in the front of the motor vehicle. Positioning of the light sources is such as to block direct transmission of the light forwardly from the light sources forwardly of the motor vehicle.

37 Claims, 26 Drawing Figures

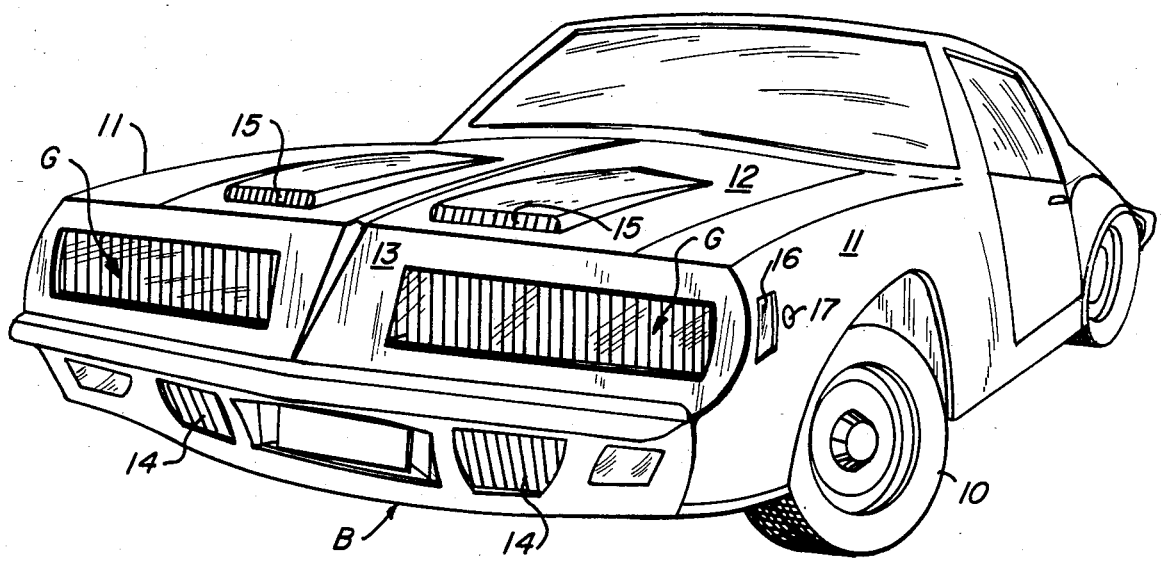
Fig_1
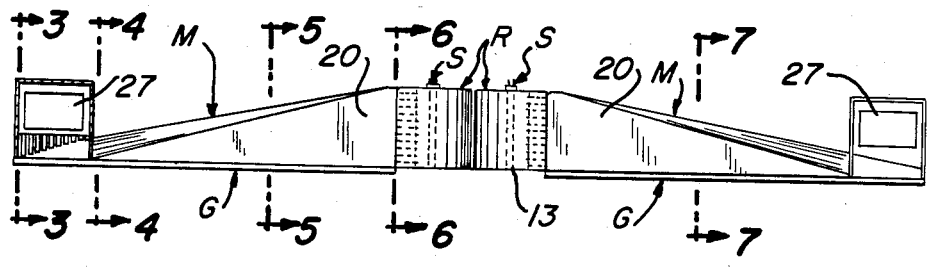
Fig_2
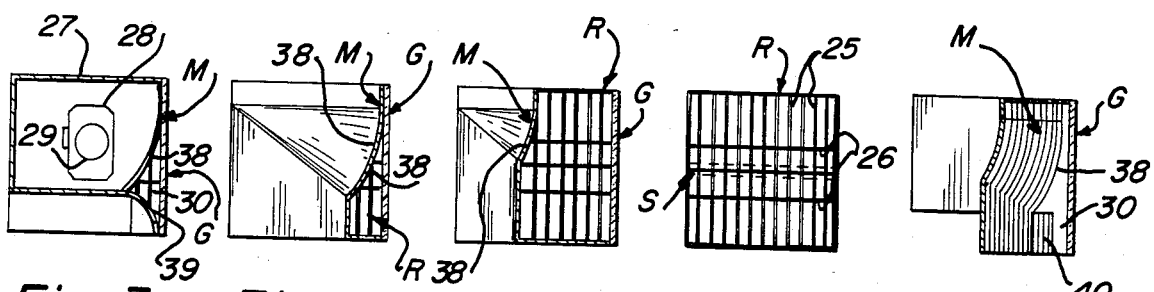
Fig_3  Fig_4  Fig_5  Fig_6  Fig_7

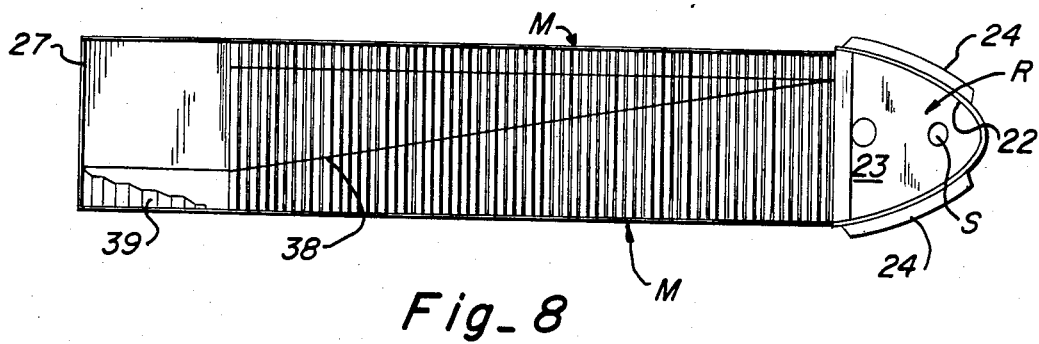
Fig_8
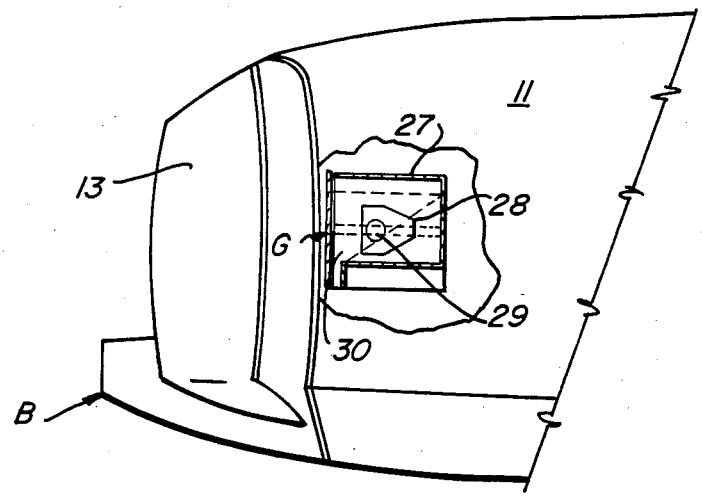
Fig_9
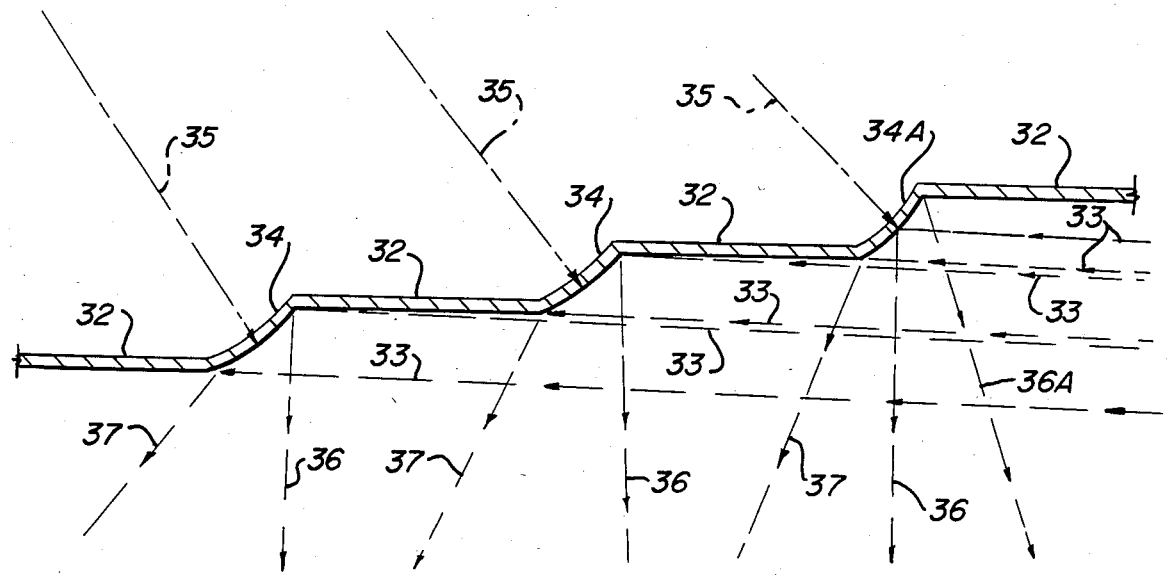
Fig_10

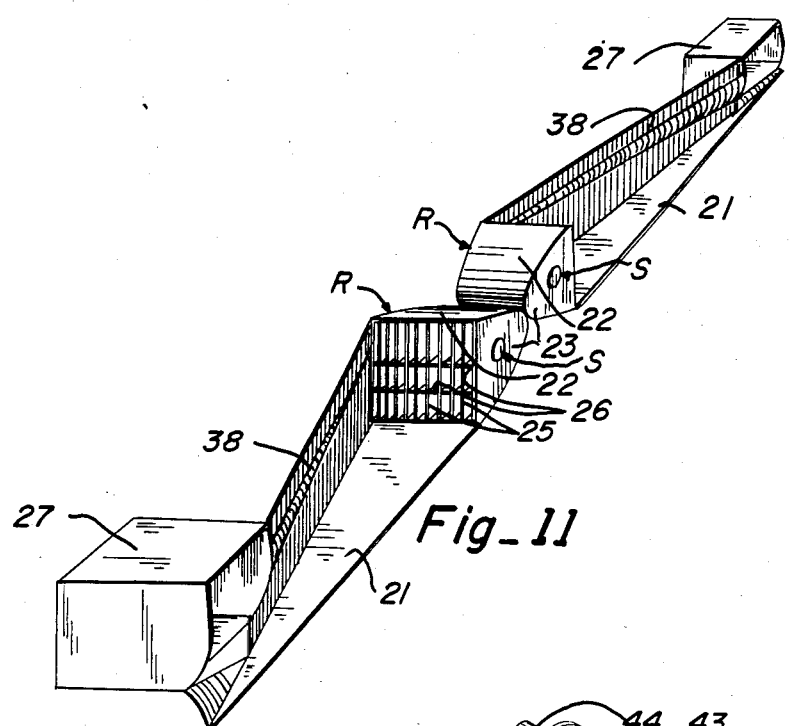
Fig_11
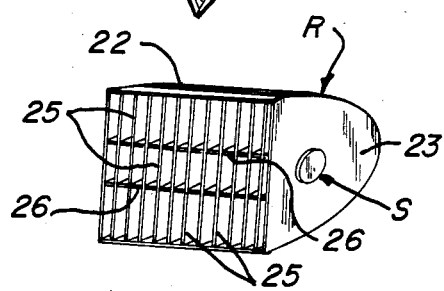
Fig_12
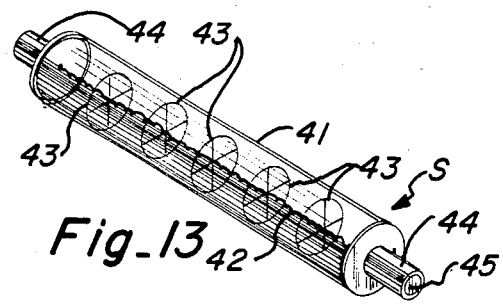
Fig_13
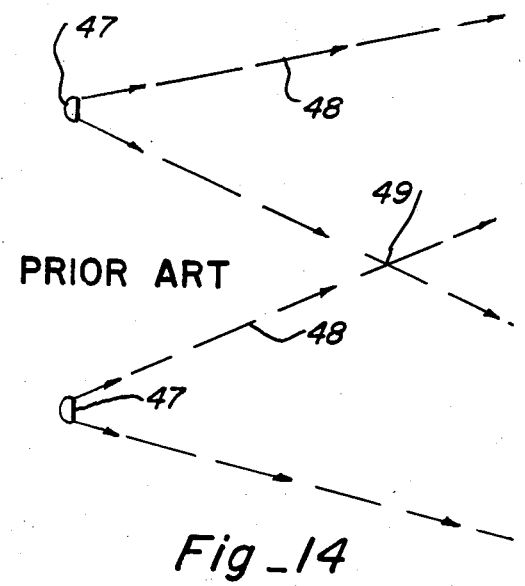
PRIOR ART
Fig_14
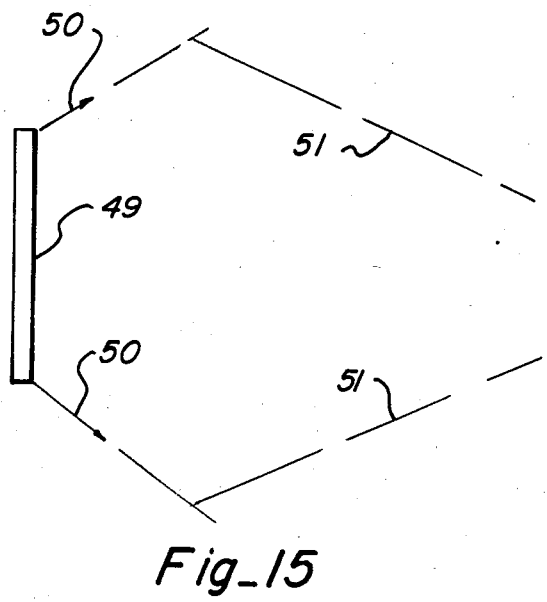
Fig_15

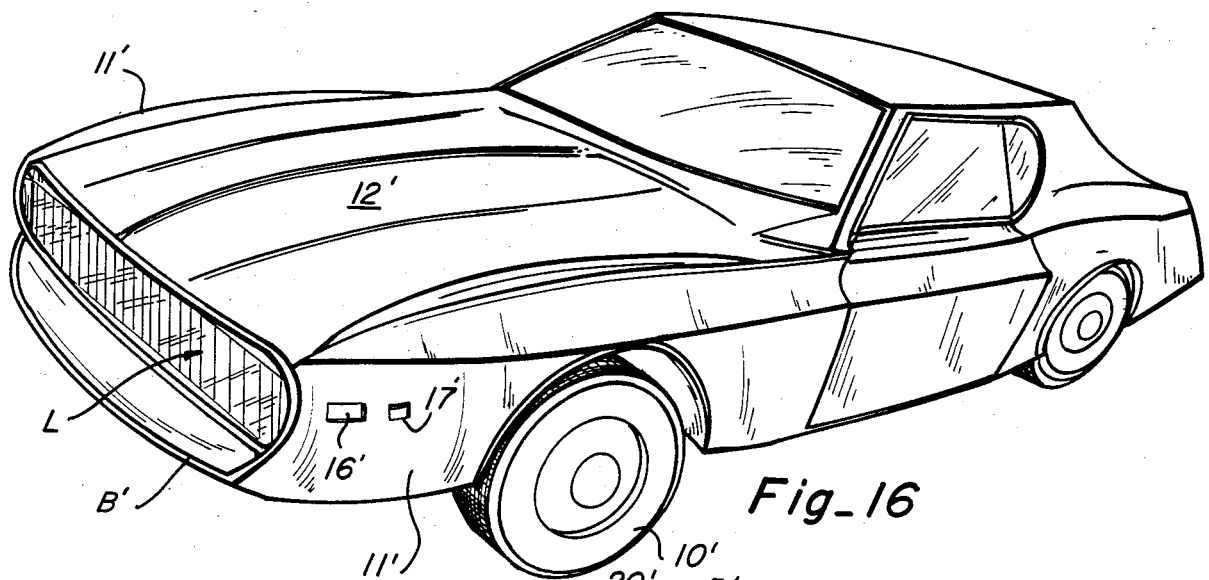
Fig_16
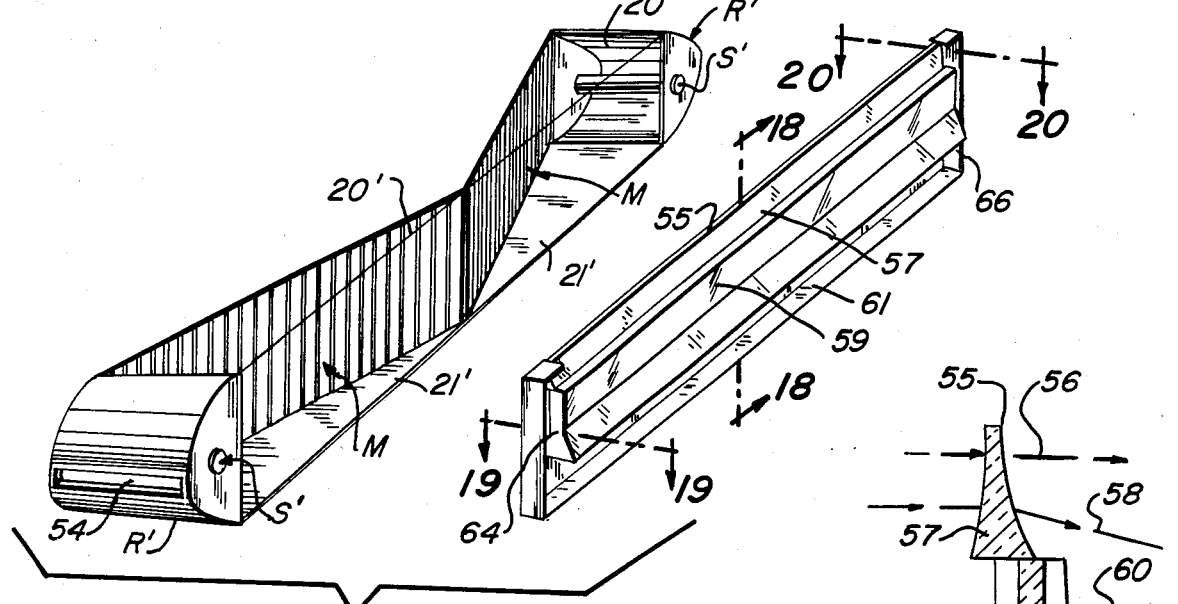
Fig_17
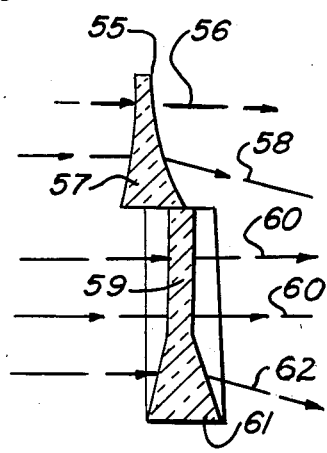
Fig_18
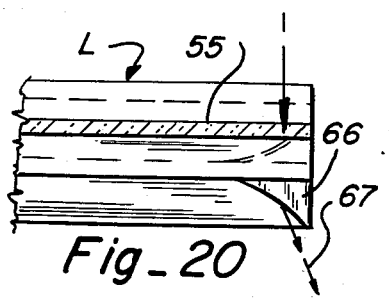
Fig_20
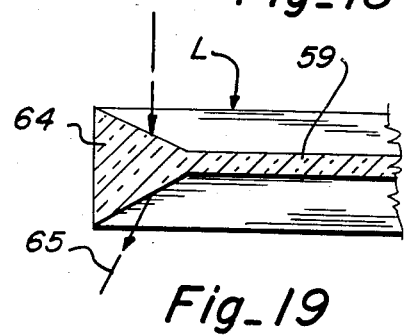
Fig_19

FRONT LIGHTING SYSTEM FOR MOTOR VEHICLE

BACKGROUND OF THE INVENTION

This invention relates to automobile lighting systems, and particularly a lighting system which is adapted to be utilized for the headlights of an automobile or similar type of motor vehicle.

The conventional headlights of an automobile or similar type of vehicle comprise a pair of forwardly directed semiparabolic reflectors or mirrors which are mounted at each side of the front of the automobile and reflect forwardly light rays emanating from a light bulb filament mounted at the center of the reflector. Such headlights, particularly on "bright" or "high beams", frequently used for fast driving or winding roads, are a danger to oncoming motorists, since the light beam is intense in an upward direction in order to provide adequate illumination a considerable distance down the road. For a depressed beam or "dim" light, current may be supplied to an off center filament which produces less total light than the "bright" filament, and also directs the light downwardly onto the road a relatively short distance ahead of an automobile. A variation of this construction consists of two sets of headlights, one for the down or "dim" lights, and the other for the "bright" or straight ahead lights.

The light rays produced by the "bright" filament, when reflected directly forward by a parabolic reflector, are quite difficult to control.

SUMMARY OF THE INVENTION

In order to minimize the glare of the headlights, but still provide adequate illumination, an equal or greater amount of light is produced in parabolic reflectors at the center or at each side of the front of a motor vehicle, with the light rays initially directed in horizontal, parallel paths, transverse of the motor vehicle. Mirrors located in a plane generally at an acute angle to the light rays are used to direct the light downwardly and forwardly of the vehicle with a substantial major component of the directed light being angled downward relative to the initial horizontal paths of the light rays. Direct forward transmission of the light is blocked.

The mirrors may be provided in a number of different ways. A stepped mirror may be used having a plurality of laterally spaced, reflective facets or offsets which may be convex to spread the light. This arrangement reflects each increment of light received by the respective facet laterally, forwardly, and downwardly normally through a glass cover. Mirrors may be divided into vertical sections which direct light both downwardly and forwardly at different angles for each section. While the total amount of light projected onto the road ahead of the automobile is similar or greater to the total amount of light projected by previous headlights, the light is better distributed and minimizes the possibility of discomfort to an oncoming driver.

Another arrangement utilizes a stepped mirror having a plurality of laterally spaced, reflective facets or offsets which may be convex to spread the light laterally, and which will reflect each increment of light received by the respective facet forwardly and through a lens or prism for a selective refraction thereof. The mirrors, which are left, right or at the center of the front of the motor vehicle, and the lenses, which may be similarly arranged, may extend across substantially the entire front of the motor vehicle. Also, a beam having approximately the same intensity across its width may be directed forwardly to one side of the motor vehicle. Each lens may be divided into sections which direct the light both downwardly and forwardly at different angles for each section. With both constructions, not only can glare of the headlights be minimized, but also the light can be better controlled and directed to where it is needed.

DESCRIPTION OF THE DRAWINGS

FIG. 1 is a front perspective view of an automobile provided with a headlight system in accordance with this invention.

FIG. 2 is a top plan view of the headlight system of the automobile of FIG. 1.

FIGS. 3 through 7, inclusive, are fragmentary sections taken along lines 3—3, 4—4, 5—5, 6—6, and 7—7, respectively, of FIG. 2.

FIG. 8 is a fragmentary front view, on an enlarged scale, showing a portion of the headlight system of FIG. 2, but with a front or glass cover portion of the system broken away to show the mirror and reflector.

FIG. 9 is fragmentary side view of the front end of the automobile FIG. 1 partially broken away to show the location of the headlight system.

FIG. 10 is fragmentary lateral cross section, on an enlarged scale, of a portion of the reflecting mirror of the headlight system of FIG. 2.

FIG. 11 is a perspective view of the lighting system, with certain parts omitted to show the details thereof.

FIG. 12 is a perspective view of a preferred reflector unit used in the invention.

FIG. 13 is a perspective view of a preferred lamp for use in the lighting systems of the invention.

FIG. 14 is a top view of the light pattern produced by conventional headlights.

FIG. 15 is a top view of the distribution pattern of light produced by the lighting system constructed in accordance with the invention.

FIG. 16 is a perspective view of another automobile, provided with an alternative headlight system according to the invention.

FIG. 17 is an exploded perspective view of the lighting system of FIG. 16.

FIG. 18 is a vertical section, taken along line 18—18 of FIG. 17.

FIG. 19 is a fragmentary horizontal section, on an enlarged scale, taken along line 19—19 of FIG. 17.

FIG. 20 is a fragmentary section, on an enlarged scale, taken along line 20—20 of FIG. 17.

DESCRIPTION OF PREFERRED EMBODIMENTS

Figure 21:
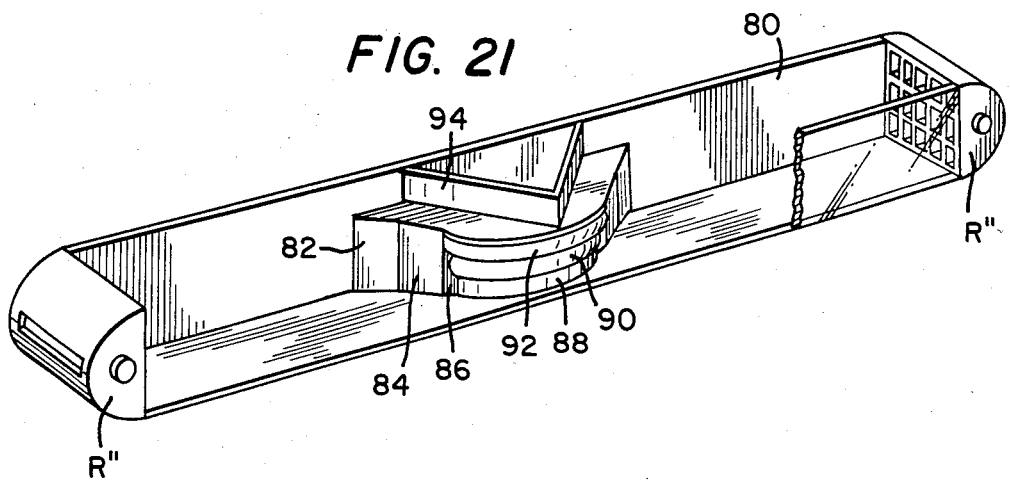
FIG. 21 is a perspective view of a preferred lighting system according to the invention.
Figure 22:
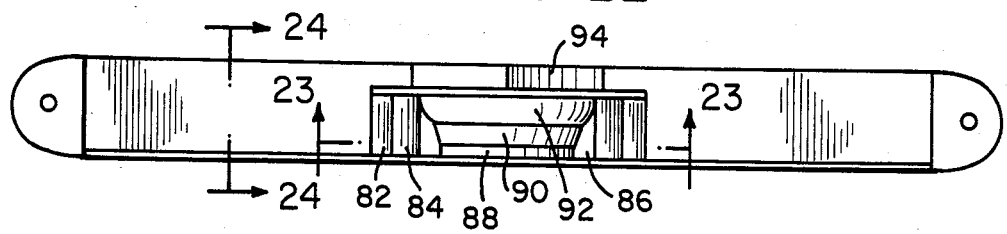
FIG. 22 is an elevation of the system in FIG. 21.

As shown in FIG. 1, the lighting system of the invention may be applied to an automobile having front wheels 10, a bumper B, front fenders 11 and a hood 12. As shown in FIGS. 1–3, one form of lighting system of this invention may include a parabolic reflector R at the left and right, respectively, of the center of the front of the automobile and behind a center post 13, with a light source S, such as an elongate lamp, placed at the focus of each parabolic reflector. Center post 13 blocks direct forward transmission of light. A pair of mirrors M, which are each angled forwardly from the center toward each side, receive the light from the corresponding reflector R, to reflect it forwardly and downwardly to the road, through a glass cover G. The respective side units are also provided with an additional mirror section, described later, which will direct light upwardly onto signs at the right hand side of the road and forwardly to the side at the left.

Since the mirrors M and the glass cover G occupy a considerable amount of space above the bumper B, air scoops 14 interspersed with sections of the bumper and air scoops 15 in hood 12 may be provided for cooling the engine.

Either air scoop 14 or 15 may be provided with a decorative grill, if desired. On each side, the fender 11, as in FIG. 1, may be provided with a side light glass 16 and a turn signal light lens 17.

A dust tight enclosure is formed for each reflector R and mirror M, together with a glass cover G, which may be divided into separate halves at the left and right, respectively. For this purpose, a top plate 20 of FIG. 2 and a bottom plate of FIG. 11 extend from the top and bottom, respectively, of the corresponding glass cover G to the top and bottom of each mirror, respectively, as well as being sealed to corresponding reflector R. Each reflector R is preferably spring mounted, to minimize damage to the light source S by shocks, jars or vibration.

Or, the entire assembly comprising the reflectors, mirrors and glass covers may be spring mounted, and on supports which will permit adjustment of the lighting system. The top and bottom plates may be connected at different places by posts or the like which may be resiliently supported from or anchored to the chassis. It may be desirable to enclose each mirror and glass cover G in a frame which, in turn, is connected to the supporting posts.

As shown in FIGS. 11 and 12, each parabolic reflector R need be parabolic in cross section in a vertical plane only, rather than being a parabolic surface of revolution, as are the reflectors of conventional headlights. The elongated light source S is placed at the focus of the parabola, so that the parallel rays will be reflected along the width of the relfector and also from the top or bottom of the reflector, i.e. from the top to bottom of the mirror M. Thus, each reflector R in FIGS. 8, 11 and 12, has a parabolic surface 22 and a pair of end walls 23. A series of heat dissipating fins 24, shown in FIG. 8, may be mounted on the outside of the parabolic wall of the reflector. A non-reflecting surface at the vertex of parabola may be used to reduce heat between the lamp and the vertex. A series of vertical louvres 25, shown in FIGS. 11 and 12, may be blackened to absorb light and may be mounted at the light discharge side of each reflector R, to intercept most angular light rays, i.e. other than parallel rays. Also, several horizontal louvres 26, similarly blackened, may extend across the opening of each reflector R, to intercept most light rays emanating from the light source which are essentially other than parallel to the remaining rays. As shown in FIGS. 2 and 11, a box 27 may be placed inside the fenders 11 for receiving a turn signal light mechanism 28, the light from the turn signal mechanism being transmitted to the lens 17 by a plastic cylinder 29 of FIG. 9. The space 30, between glass cover G and mirror M at the end of the mirror, permits light to be transmitted directly to the side light 16.

Each mirror M may be formed, as shown in FIG. 10, with a series of steps or planar surfaces 32, while each mirror is installed so that the planar surfaces 32 will be parallel to the light rays 33 projected from reflector R. Between each pair of steps 32 is an offset 34, which may be planar or convex, i.e. slightly curved about an elongated radius 35, so that the initial ray of light 36 will be reflected from the convex offset in a direction perpendicular to the adjacent planar step 32, but the last ray 37 at the opposite edge of the offset 34 will be inclined at an angle such that when the two light rays 36 and 37 reach a point fowardly of the glass cover G, an area corresponding generally to the distance between one convex offset and the next convex offset will be covered by the light rays between the rays 36 and 37. However, the curvature of the first offset 34A may be such that the light rays, such as 36A, reflected therefrom will also cover the area in front of the adjacent reflector R. Thus, there will be a continuous distribution of the light forwardly of the vehicle.

The mirror M may be formed of plastic or metal which may be coated or plated with chromium, nickel or the like to form a reflecting surface which may be highly polished on each of the convex offsets 34. Then mirror may be formed of highly polished aluminum or the like.

In addition to the steps and convex offsets shown in FIG. 10, each mirror M is provided, as shown in FIG. 3-5 and 11, with a slightly downwardly facing convex surface 38 which is formed with steps and offsets but is low at the inside and high at the outside of the mirror in order to divert an increasing portion of the light rays downwardly toward the roadway. The surfaces 38 are of particular significance in providing for a non-glare downward angling of a significant or major portion of the reflected rays. The reflective stepped surface 39 at the end of the mirror at the right faces upwardly at an angle, to illuminate road signs, street markers and the like by light reflected therefrom. The reflective stepped surface 40 of the mirror at the left reflects light forwardly and downwardly to the left.

The light source S, as shown in FIG. 13, may comprise a transparent tube 41 in which a filament 42 is centrally installed. The filament extends through the center of a series of supporting or spacing discs 43 which prevent sagging of the filament when hot. The filament also extends between a pair of end connectors 44 which close the tube 41 and through which the filament extends to a contact 45, placed either at the end or on one side of each connector 44, for supplying current to the filament when a light source S is installed in suitable spring clips or other mounting arrangement associated with the reflector R.

FIG. 14 shows light patterns produced on the ground by a pair of conventional headlights 47, which produce a pair of cones 48 of light which intersect at 49, substantially forward of the vehicle and cross over each other to diverge light to each side of the road, as the cones spread, rather than on the roadway ahead where it is needed most. In contrast therewith, a headlight assembly 49 of this invention shown in FIG. 15 will, in essence, produce a beam which spreads laterally at 50 to each side but then converges at 51, so that the light beam down the road is concentrated on the road, rather then being spaced laterally to hinder the vision of an oncoming drive. It will also be appreciated that a solid area of illumination is provided from the vehicle forward.

In the alternative lighting system installed on the automobile as shown in FIG. 16 and having front wheels 10', a front bumper B', front fenders 11' and a hood 12', a lens L extends almost the full width of the front of the automobile, including the center. A pair of reflectors R are mounted at the opposite end of the lighting system corresponding to the opposite sides of the motor vehicle and within opposite fenders 11', so that the light from each source S' is reflected laterally from each side toward the center, rather than from the center outwardly to each side. The reflectors R' and sources S' may be constructed similarly to the reflectors and sources previously described, except that a slot 54 in the rear of each reflector R' permits sufficient light to illuminate the corresponding side light 16' of FIG. 16. Such slot also serves to dissipate the heat produced at the vertex of the parabola. Each mirror M' is provided with series of planar surfaces and offsets such as the type illustrated in FIG. 10, with offsets which are curved about a long radius to cause the light rays reflected from each offset to diverge and cover the area of the next succeeding planar surface. However, the inclined surface 38 of FIGS. 3–5 is not necessary in this instance. Each stepped mirror M' is placed at an angle with respect to the front of the vehicle, with the mirrors converging forwardly at the center, and extending rearwardly at the sides, in order to prevent light rays of one reflector from hitting the opposite reflector. Since the mirrors M' extend to the center of the car, there is no need for a variation in the curvature in the central offsets to spread light to cover the central area.

The lighting units are assembled with top plates 20' and bottom plates 21', top plate 20' being broken away to show the mirrors in FIG. 17.

Each lens L, as in FIGS. 17 and 18, is provided, except at its ends, with an upper planar section 55 through which light, such as ray 56, is directed down the road. Below section 55 is an essentially trapezoidal shaped section or prism 57 which is slightly concave on each side, so that the light rays reflected from the mirror M' will be deflected or refracted downwardly, such as shown by ray 58, but at an increasing angle from the top to the bottom of the prism. Below the prism 57 is a planar section 59 from which the light rays, such as ray 60, will be directed forwardly in parallel relation. Below section 59 is another trapezoidal section or prism 61 from which light rays, such as ray 62, are directed or refracted at increasing angles downwardly.

As shown in FIG. 19, at the right front of the automobile, lens L is a prism 59 which directs light rays 60 to the side of the automobile. At the left front of the automobile lens L, shown in FIG. 20, is a rear side concave curvature 66 which directs some of the light rays, such as ray 67, downwardly to that side.

It will be noted that the blackened louvres 26 and 27 may tend to decrease to an undue extent the amount of light enamating from the reflectors R. If this is the case, then the blackened louvres may be omitted and the non-parallel light rays permitted to impinge upon the offsets 34 of the mirror M. In such instance, depending on the parabolic reflector R and the light produced by the light source S, the non-parallel light rays may be sufficient in number and in such direction that it is unnecessary to curve the offsets 34, since a random array of light striking a flat but angular surface will tend to produce rays which are reflected directly forwardly and other rays which are reflected to one side or the other of a strictly forward direction.

In a particularly preferred embodiment of the invention shown in FIGS. 21–26, the parabolic reflectors R" are placed at the outside ends of the front lighting unit, as they are in FIG. 17 as disscussed previously. However, instead of providing forwardly angled mirror extending from the reflectors to the center of the lighting unit, the forwardly angled mirrors are provided only over an intermediate portion corresponding to the center of the automobile. The back wall 80 between reflectors R" and the mirrors is substantially nonreflective, and may include a grill.

Figure 26:
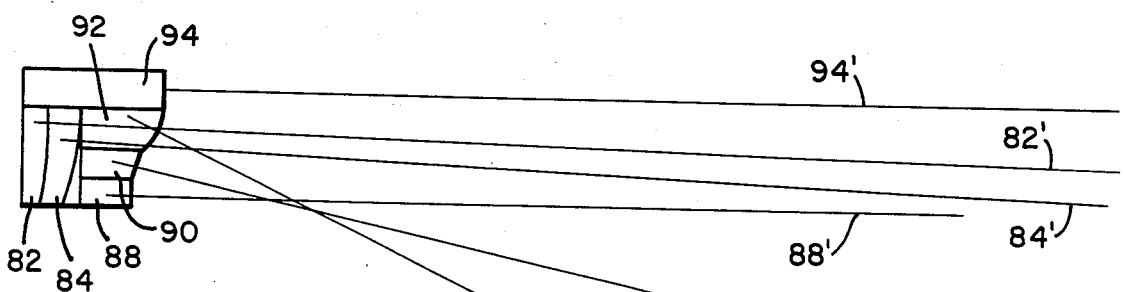
FIGS. 25 and 26 are generally schematic views of the horizontal and vertical distribution patterns, respectively, of light produced by the lighting system shown in FIGS. 21—24.
Figure 25:
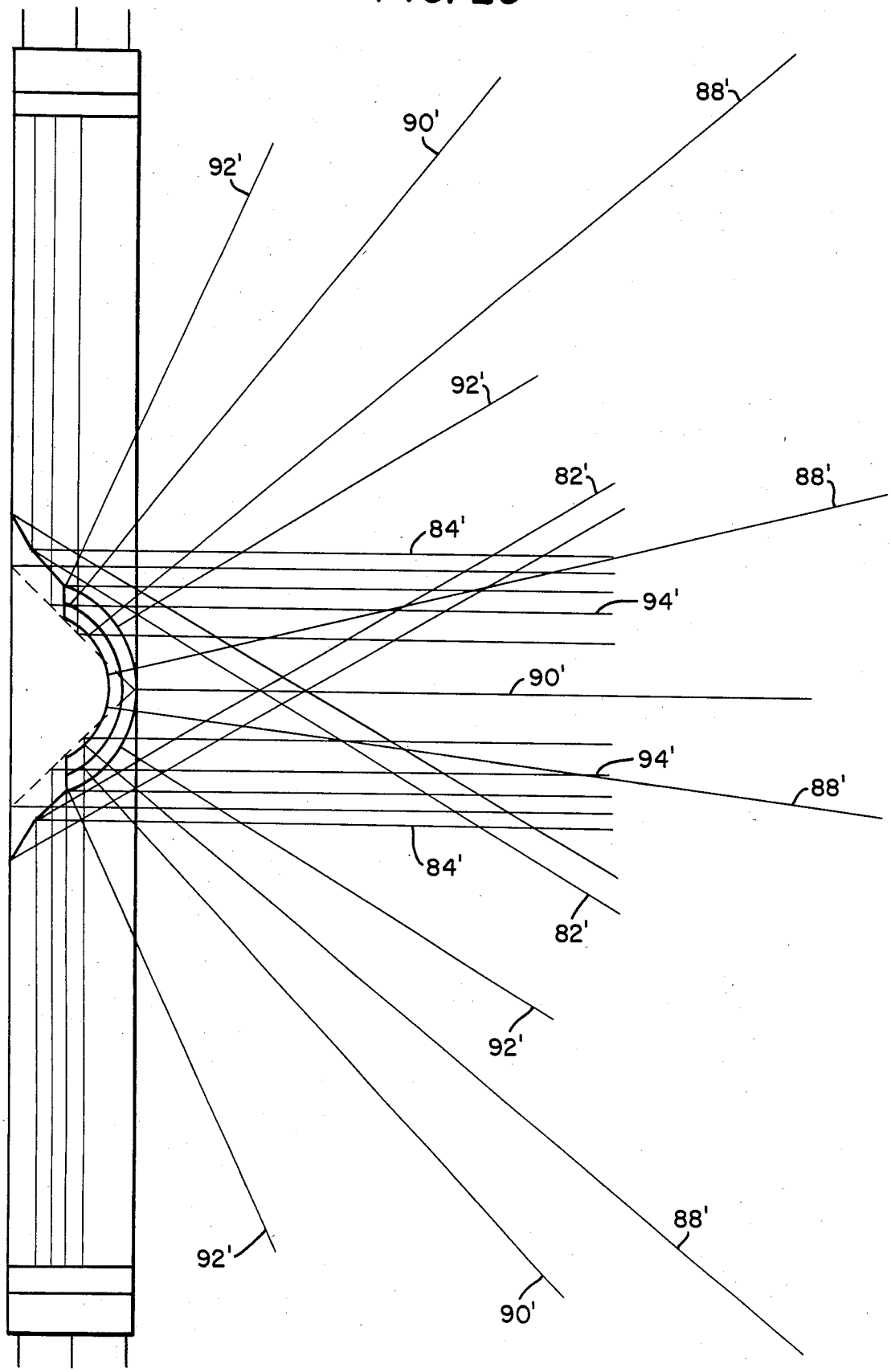

The mirror assembly itself, of a width approximately one-third that of the lighting unit, comprises multiple angularly related mirrors which extend the full height of the lighting unit as defined by the height of the reflector R". The mirrors, as suggested in FIGS. 25 and 26 are positioned to provide an illumination pattern which, while concentrated along the central path of the vehicle in a substantially non-glare manner, also provides a degree of side illumination for road signs and the like.

The mirror assembly includes a pair of vertical side mirrors 82 spaced longitudinally along the length of the lighting unit to opposite sides of the center line thereof. The side mirrors 82 angle inwardly and forwardly toward each other from the back wall 80 and define included angles of approximately 30 degrees. These side mirrors 82 are particularly positioned whereby the reflected light rays 82', originating from the opposed reflectors R", angle to the opposed sides of the vehicle substantially forward thereof and in manner which will effectively illuminate the sides of a road being traversed, as well as any road signs or the like.

A second pair of vertical mirrors 84 are positioned immediately inward of the mirror 82 and are angled at approximately 45 degrees to the back wall 80 for a forward reflection of the light rays 84' over a limited horizontal span.

Mirrors 82 and 84 may be made slightly vertically convex for a limited downward spread of light reflected therefrom.

A central mirror stack is provided between vertical mirrors 84 and includes a pair of non-reflective face panels 86 parallel to the back wall 80. Three vertically stacked mirrors are provided between the back panels and project forwardly thereof in the path of the light rays originating from the opposed light sources.

The lowermost mirror 88 of the stack is in the form of a section of a vertical cylinder to basically provide multiple forwardly directed and horizontally diverging reflected light paths 88'.

The intermediate mirror 90 of the stack, of a horizontal dimension slightly greater that that of mirror 88, is in the form of a section of a vertical inverted truncated cone to provide reflected light paths 90' which extend forwardly and downwardly generally below the rays or light paths 88' in a horizontally spread pattern similar to but of a greater arcuate extent than that of the rays 88' from mirror 88.

The uppermost mirror 92 of the mirror stack, of a horizontal dimension slightly greater than that of mirror 90, is in the form of a section of a sphere, providing a vertical cross-section which is convex with all points therealong angling downward relative to the horizontal at progressively greater angles thereto from the top of mirror 92 to the bottom thereof where it joins the top of mirror 90. This "spherical" mirror 92 provides an outwardly and downwardly directed pattern of light paths or rays 92' generally below the rays 90' in a vertically spread pattern crossing the rays 88' and 90' close to the front of the vehicle and providing an area of solid illumination forwardly and downwardly of the vehicle. The rays 92' also horizontally spread or diverge in a pattern similar to but of a greater arcuate extent than that of rays 90'.

Each of the three stack mirrors will generally individually comprise a continuously formed smooth surface mirror. The two mirrors 88 and 90 are of generally equal height with the mirror 92 of a height equal to the combined height of mirrors 88 and 90. The vertical height of the mirrors 82 and 84 to the opposed sides of mirrors 88, 90 and 92 are equal to the combined height of these three mirrors.

The mirror stack and vertical mirrors are of a height approximately two-thirds that of the lighting unit with a pair of horizontally elongate planar mirrors 94 positioned between the top of the mirror stack and the top of the lighting unit. The mirrors 94 converge forwardly from rear edges at the back wall 80, generally paralleling the angle of the mirrors 84 and meeting at a 45 degree angle on the centerline of the mirror stack at the forwardmost point of the "spherical" mirror 92.

These mirrors 94 will provide for a vertically narrow substantially horizontal forward reflection of the light rays 94' for maximum distance along the centerline of the vehicle and immediately between the rays 84' reflected by side mirrors 84.

Figure 23:
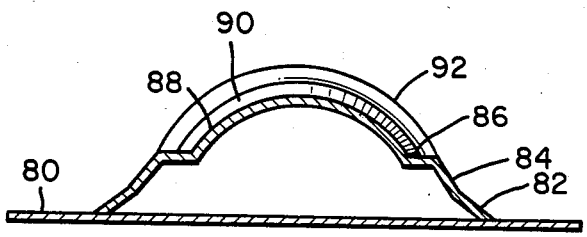
FIGS. 23 and 24 are fragmentary sections taken along lines 23—23 and 24—24, respectively, of FIG. 22.
Figure 24:
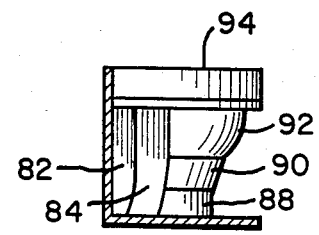

The horizontal distribution of light produced by this mirror configuration can be seen from FIG. 25, which illustrates the mirror assembly as in FIG. 23; the vertical distribution of the produced light is schematically presented in FIG. 26, which illustrate the mirror assembly as in FIG. 24.

As will be appreciated, the major components of the generated light, provide a significant area of "non-glare" illumination downwardly from the horizontal and forward of the vehicle along the path thereof with a selective illumination of the sides of the roadway. Spherical mirror 92 reflects most of its light in a horizontal arc downwardly in a vertical spread across the entire front of the automobile or vehicle. As such, this spherical mirror has essentially the same function as angled convex portion 38 shown in FIG. 11 which also scatters light downwardly and across the front of the automobile. Conical mirror 90 also reflects the light substantially downwardly, but more toward the center of the field in front of the automobile, and at a greater distance forward of the automobile. Cylindrical mirror 88 reflects light substantially in a horizontal plane directly forward with some minor reflection to the sides.

Planar mirrors 94 reflect light rays 94' in a substantially horizontal plane, and in a fairly narrow vertical and horizontal range directly forward of those mirrors and the centerline of the vehicle. The mirrors 84 also reflect their light rays 84' in a fairly narrow span directly forward and immediately to each side of the rays 94'. Where these mirrors 84 are slightly convex, the light also will be directed in a downwardly diverging pattern.

Mirrors 82, when slightly convex, also reflect their light rays 82' slightly downward, converging at a distance forward of the automobile and continuing to the opposed sides of the road.

It will be recognized that the forwardly directed rays spread in a horizontal pattern forward of the vehicle are all, or substantially all, specifically downward directed or spread from the horizontal, thus reducing to a minimum the potential for disturbing glare for oncoming traffic. The rays specifically horizontally directed, such as rays 84' and 94' are in a horizontally restricted pattern along the centerline of the originating vehicle, providing maximum forward illumination along the path of travel with minimal glare for oncoming vehicles normally along a parallel path substantially laterally offset from that of the originating vehicle.

What is claimed is:

1. In a motor vehicle, an elongate front lighting system mounted transversly across the front of the vehicle and including opposed ends generally adjacent opposed sides of the vehicle, said system comprising:
   a pair of light sources mounted on said vehicle for producing light rays, means associated with said light sources for directing said light rays along generally parallel paths transverse of the motor vehicle;
   mirror means mounted generally at acute angles in the paths of the generally parallel light rays for directing the light rays forwardly of the motor vehicle;
   means for directing a substantial portion of the light rays downwardly forward of the motor vehicle;
   means for blocking direct transmission of the light forwardly from said light sources forwardly of the motor vehicle.

2. A front lighting system as defined in claim 1, wherein said light sources are positioned in the center of the lighting system for projecting light rays in direction toward the opposed ends thereof corresponding to the sides of the motor vehicle.

3. A front lighting system as defined in claim 1, where each said light source is positioned adjacent a side of the motor vehicle, for projecting light rays in a direction towards the center of the motor vehicle.

4. A front lighting system as defined in claim 1, wherein said mirror means comprises a pair of elongated stepped mirrors, one stepped mirror associated with each light source, each mirror having a plurality of portions for reflecting the light rays forwardly, and a plurality of spaced portions generally parallel to the light rays, each said mirror extending horizontally from the associated light source and at an angle thereto to intersect substantially all of the light paths of the rays from the associated light source at longitudinally different points along the length of the mirror.

5. A front lighting system as defined in claim 4, wherein selected reflecting portions are curved to be convex to the light rays, such that the light rays reflected to each reflecting portion will diverge in front of the motor vehicle.

6. A front lighting system as defined in claim 1, wherein said light sources each coprises an elongated lamp having its longitudinal axis disposed generally perpendicular to the front of the motor vehicle, and said means associated with said light sources comprises a reflector which is parabolic in cross-section only in a vertical plane parallel to the front of the motor vehicle about each lamp opening transversely of the motor vehicle and toward said mirror means.

7. A front lighting system as defined in claim 6, wherein each said parabolic reflector comprises heat dissipating fins at the top and bottom thereof.

8. A front lighting system as defined in claim 3, wherein said light sources each comprises an elongated lamp having its longitudinal axis disposed generally perpendicular to the front of the motor vehicle, said means associated with said light sources comprises a reflector which is parabolic in cross-section only in a vertical plane parallel to the front of the motor vehicle about each lamp opening transversely of the motor vehicle and towards said mirror means.

9. A front lighting system as defined in claim 8, wherein each said parabolic reflector includes a longitudinal slot at the vertex of the parabola adjacent the corresponding side of the motor vehicle, and side light means on said vehicle aligned with said slots for illumination by light rays passing through the slot 10. A front lighting system as defined in claim 5, wherein each said reflecting portion is provided with a section which reflects light downwardly, the vertical extent of said downwardly reflecting section being smallest on these reflecting portions nearest the center of the front of the vehicle, and progressively increasing as the distance from the center increases.

11. A front lighting system as defined in claim 1, wherein said means for directing a portion of said rays downwardly comprising lens means positioned in front of said plurality of mirror means, said lens means including a portion for transmitting light rays forwardly, and a portion for refracting light rays downwardly.

12. A front lighting system as defined in claim 1, additionally comprising lens means for refracting light rays upwardly to the right side of the vehicle.

13. A front lighting system as defined in claim 3, wherein said mirror means is positioned in spaced relation to said light sources and in the vicinity of the center of the vehicle, said lighting system being nonreflecting for the section between each said light source and said mirror means, said mirror means being angled in front of said reflectors to intersect substantially all of the light paths at the center of the vehicle.

14. In a motor vehicle, an elongate front lighting system mounted transversely across the front of the vehicle and including opposed ends generally adjacent opposed sides of the vehicle, said system comprising:
a pair of light sources mounted on said vehicle for producing light rays, each light source mounted adjacent a side of the motor vehicle, means associated with said light sources for directing said light rays along generally parallel paths transverse of the motor vehicle, toward the center of the motor vehicle;
mirror means mounted generally at acute angles in the paths of the light rays for directing the light rays forwardly of the motor vehicle;
means for directing a substantial portion of the light rays downwardly forward of the motor vehicle;
means for blocking direct transmission of the light forwardly from said light sources forwardly of the motor vehicle;
wherein said mirror means is positioned in spaced relation to said light sources and in the vicinity of the center of the vehicle, said lighting system being non-reflecting for the section between each said light source and said mirror means, said mirror means being angled in front of said reflectors to intersect substantially all of the light paths at the center of the vehicle; and
wherein said mirror means includes a stack of longitudinally extending mirrors of different ray directing angular configurations.

15. A front lighting system as defined in claim 14, wherein the stacked mirrors include a lower mirror with a forwardly convex reflective surface of generally cylindrical configuration.

16. A front lighting system as defined in claim 15, wherein the stacked mirrors include a second mirror extending upward from said lower mirror and having a forwardly convex reflective surface of generally conical configuration.

17. A front lighting system as defined in claim 16, wherein the stacked mirrors include a third mirror extending upward from said second mirror and having a forward convex reflective surface of generally spherical configuration.

18. A front lighting system as defined in claim 17, wherein said mirror means additionally includes vertical planar mirrors angled with respect to the light rays and positioned between said stacked mirrors and said nonreflecting sections.

19. A front lighting system as defined in claim 6, wherein each said reflector includes at least one set of louvres to direct the produced light rays.

20. In a motor vehicle, a front headlight system, said system comprising a light assembly including a pair of light ray emitting light sources mounted in alignment transverse across the front of the vehicle, reflector means associated with each light source for directing rays emitted thereby along generally parallel horizontal paths transverse across the front of the vehicle, and light ray directing means for intersecting the generally parallel rays at selected points along the paths thereof and reflecting at least a substantial portion of said rays generally laterally of and vertically downwardly from the paths forward of the front of the vehicle.

21. The headlight system of claim 20 wherein said light ray directing means includes mirrors interposed within the light paths.

22. The headlight system of claim 21 wherein said mirrors are angularly positioned in vertical planes for a generally lateral reflection of said light rays, selective ones of said mirrors also being configured to present forwardly and downwardly reflecting surfaces.

23. The headlight system of claim 22 wherein said light assembly includes remote ends adjacent the opposite sides of the vehicle, and a central area generally at the front-to-rear central line of the vehicle, said light sources being positioned adjacent said remote ends, said reflector means being generally outward of the associated light sources for directing emitted rays towards said central area, said mirrors being longitudinally inward of said light sources between said light sources.

24. The headlight system of claim 23 wherein said mirrors are at said central area longitudinally spaced from said light sources.

25. In a motor vehicle, a front headlight system, said system comprising a light assembly including a pair of light ray emitting light sources mounted in alignment transverse across the front of the vehicle, reflector means associated with each light source for directing rays emitted thereby along the generally parallel horizontal paths transverse across the front of the vehicle, and mirrors interposed within the light paths for intersecting the generally parallel rays at selected points along the paths thereof and reflecting at least a substantial portion of said rays generally laterally of and vertically downwardly from the paths forward of the front of the vehicle, said mirrors being angularly positioned in vertical planes for a generally lateral reflection of said light rays, selective ones of said mirrors also being configured to present forwardly and downwardly reflecting surfaces;

said light assembly having remote ends adjacent the opposite sides of the vehicle, and a central area generally at the front-to-rear central line of the vehicle, said light sources being positioned adjacent said remote ends, said reflector means being generally outward of the associated light sources for directing emitted rays toward said central area, said mirrors being at said central area longitudinally inward of said light sources, between said light sources, and longitudinally spaced from said light sources;

said system including a vertical stack of said mirrors substantially completely interposed within the light paths between the opposed reflectors, said stack including at least two mirrors, one above the other, each mirror comprising said selective mirrors with forwardly and downwardly directed reflecting surfaces.

26. The headlight system of claim 25 wherein the upper one of said two mirrors has a forwardly convex reflecting face of generaly spherical configuration.

27. The headlight system of claim 26 wherein the lower of the two mirrors has a forwardly convex reflecting face of generally conical configuration.

28. The headlight system of claim 27 including a third mirror underlying said two mirrors and having a forwardly convex face of generally cylindrical configuration.

29. The headlight system of claim 28 including at least one vertical mirror to each side of said stack and of substantially equal height with said stack.

30. The headlight system of claim 29 including a second vertical mirror to each side of said stack, each of the two vertical mirrors being angularly positioned in different vertical planes.

31. The headlight system of claim 30 including a pair of top mirrors overlying said stack, said top mirrors converging forwardly with each top mirror extending horizontally in a vertical plane at approximately 45 degrees to the horizontal light paths of the rays from a light source.

32. The headlight system of claim 30 wherein the two vertical mirrors to each side of said stack are vertically convex.

33. The headlight system of claim 23 including mirrors progressively stepped or forward from each other continuously from each reflector to said central area.

34. The headlight system of claim 22 wherein said light assembly includes remote ends adjacent opposite sides of the vehicle, and a central area generally at the front-to-rear central line of the vehicle, said light sources being positioned at said central area, said reflector means being a generally inward of the associated light sources for directing emitted rays towards said remote ends, said mirrors being longitudinally outward of said light sources between said light sources and said remote ends.

35. The headlight system of claim 34 wherein said mirrors are progressively stepped forward from each other continuously from each reflector to the corresponding remote end.

36. The headlight system of claim 21 wherein said mirrors are angularly positioned in vertical planes for a generally lateral reflection of the light rays, said light ray directing means further including lens means forward of said mirrors and in the path of light rays reflected therefrom, said lens means including refracting surfaces for downwardly directing selected ones of the reflected rays downwardly forward of the vehicle.

37. A front lighting system as defined in claim 6, wherein the parabolic reflector includes a non-reflecting portion at the vertex of the parabola.

* * * * *